United States Patent
Ogasawara (10) Patent No.: US 7,283,428 B2
(45) Date of Patent: Oct. 16, 2007

(54) STEP MOTOR DRIVE UNIT AND ANALOG ELECTRONIC TIMEPIECE

(75) Inventor: Kenji Ogasawara, Chiba (JP)

(73) Assignee: Seiko Instruments Inc. (JP)

( * ) Notice: Subject to any disclaimer, the term of this patent is extended or adjusted under 35 U.S.C. 154(b) by 58 days.

(21) Appl. No.: 11/353,468

(22) Filed: Feb. 14, 2006

(65) Prior Publication Data

US 2006/0187762 A1    Aug. 24, 2006

(30) Foreign Application Priority Data

Feb. 21, 2005    (JP) ............................. 2005-043305

(51) Int. Cl.
*G04F 5/00* (2006.01)
(52) U.S. Cl. .................. 368/157; 368/160; 318/696
(58) Field of Classification Search ................ 368/157, 368/160; 318/696
See application file for complete search history.

(56) References Cited

U.S. PATENT DOCUMENTS

| | | | | |
|---|---|---|---|---|
| 4,326,278 A * | 4/1982 | Shida et al. | ................. | 368/157 |
| 4,382,691 A * | 5/1983 | Shida et al. | ................. | 368/157 |
| 4,445,784 A * | 5/1984 | Shida et al. | ................. | 368/157 |
| 4,533,257 A * | 8/1985 | Kitano et al. | ................ | 368/202 |
| 4,912,692 A * | 3/1990 | Kamens | ...................... | 368/157 |
| 5,038,329 A * | 8/1991 | Kawamura et al. | ......... | 368/157 |
| 5,550,795 A * | 8/1996 | Takakura et al. | .......... | 368/157 |
| 5,889,734 A * | 3/1999 | Sato | ............................ | 368/64 |
| 6,108,279 A * | 8/2000 | Hara | ........................... | 368/157 |
| 6,163,126 A * | 12/2000 | Kojima et al. | .............. | 318/685 |
| 6,194,862 B1 * | 2/2001 | Hara | ........................... | 318/696 |
| 6,339,306 B1 * | 1/2002 | Hara | ........................... | 318/696 |
| 2002/0172098 A1 * | 11/2002 | Manaka | ..................... | 368/160 |

* cited by examiner

*Primary Examiner*—Gary F. Paumen
(74) *Attorney, Agent, or Firm*—Adams & Wilks (57) ABSTRACT

To make it possible by a simple constitution to perform a forcible rotation drive by a correction drive pulse and obtain a demagnetization effect. In a case where a control circuit has judged on the basis of a detection signal from a rotation detection circuit 106 that a motor has not rotated by a drive by a 1st normal drive pulse of a predetermined energy, after it has forcibly rotation-driven the motor by a correction drive pulse whose energy is larger than the 1st normal drive pulse, it rotation-drives the motor by a 2nd normal drive pulse whose polarity differs from the correction drive pulse and whose energy is larger than the 1st normal drive pulse.

8 Claims, 7 Drawing Sheets

STEP MOTOR DRIVE UNIT AND ANALOG ELECTRONIC TIMEPIECE

BACKGROUND OF THE INVENTION

1. Field of the Invention

The present invention relates to a step motor drive unit and an analog electronic timepiece in which a display hand is rotation-driven by the step motor drive unit.

2. Description of the Prior Art

From old times, there is utilized the analog electronic timepiece in which the display hand such as hour hand and minute hand is rotation-driven by the step motor drive unit. The step motor drive unit has a step motor and a drive circuit for rotation-driving the step motor.

The step motor has a stator having a rotor accommodating through-hole and a positioning part for determining a stop position of a rotor, the rotor rotatably disposed in the rotor accommodating through-hole, and a coil wound in the stator. There is adapted such that, by alternately supplying a drive pulse whose polarity differs to the coil from the drive circuit, a magnetic flux whose polarity differs is alternately generated in the stator and, by this, the rotor is rotated in a predetermined, same direction by a predetermined angle at a time and the rotor is stopped in a position corresponding to the positioning part.

As to a rotation drive of the step motor, there are demanded an energy saving and a certainty of the rotation drive. For this reason, under a normal state, the rotor is previously rotation-driven by the drive pulse of a predetermined energy (e.g., drive pulse of a predetermined width (normal drive pulse)) and, in a case where the rotor is not rotated by the rotation drive by the normal drive pulse, the rotation drive is performed by supplying the drive pulse (correction drive pulse) whose energy is higher (e.g., wider in pulse width) than the normal drive pulse. By this, the energy saving is made possible, and there is constituted such that the rotor can be certainly rotated (e.g., refer to JP-B-63-18148 Gazette, JP-B-63-18149 Gazette, JP-B-57-18440 Gazette).

In such a step motor drive unit driven by a small energy as mentioned above, the step motor is driven by plural drive pulses. However, when the rotor has not been rotated by the normal drive pulse, since the motor is rotated by the correction drive pulse, a remanent magnetism of the stator is demagnetized only when rotation-driven by the correction drive pulse, so that a demagnetization pulse whose polarity differs from the correction drive pulse is supplied to the coil.

FIG. 7 is a timing diagram of the conventional step motor drive unit, and is a diagram showing voltage waveforms of both terminals a, b of the motor.

In FIG. 7, under a normal state that a rotation drive operation is normally performed, by alternately supplying a normal drive pulse P11, of a predetermined pulse width, whose polarity differs to the terminals a, b of the motor, the rotor is rotated.

Figures 7A, 7B:
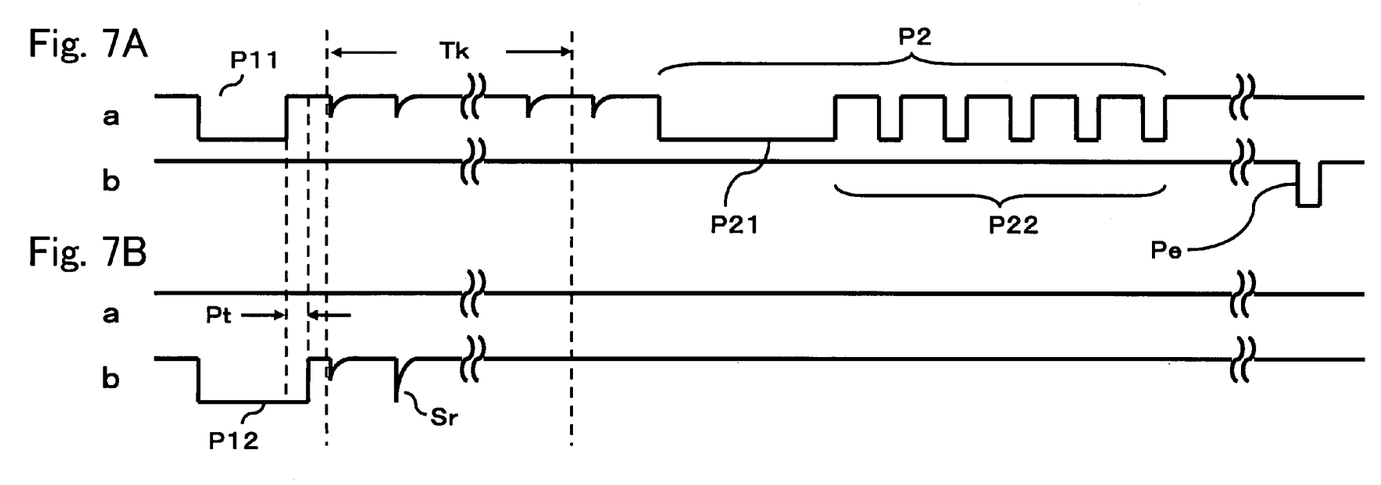
FIG. 7 are timing diagrams of a conventional analog electronic timepiece.

Like FIG. 7A, in a case where the motor does not rotate even if rotation-driven by the normal drive pulse P11, in a rotation detection term Tk since there is not detected a rotation detection pulse Sr higher than a predetermined level, it is judged that the motor is not rotating in the step motor drive unit.

In this case, after a predetermined term has elapsed after driving by the normal drive pulse P11, the motor drive unit rotation-drives the motor to thereby forcibly rotate it by a correction drive pulse P2 (constituted by a pulse portion P21 for the rotation drive and a braking pulse portion P22 for giving a braking to a vibration after a rotor rotation) whose pulse width is wider than the normal drive pulse P11 and, after a predetermined term has elapsed, supplies a demagnetization pulse Pe, whose polarity is reverse to the correction drive pulse P2, in order to demagnetize the stator having been magnetized by the drive by the correction drive pulse P2.

By this, even in a case where the rotor is not rotated by the normal drive pulse P11 owing to an increase in load and the like, it is possible to rotate the rotor by the correction drive pulse, and it becomes possible to prevent a generation of a rotation abnormality owing to a magnetization of the stator, and the like.

Next, as shown in FIG. 7B, there is rotation-driven by a normal drive pulse P12 whose width is wider by a unit pulse width Pt than the normal drive pulse P11. By this, if the rotor rotates, in the rotation detection term Tk there is detected the rotation detection pulse Sr higher than the predetermined level. By the detection of the rotation detection pulse Sr, the step motor detection unit judges that the motor has rotated. Hereafter, during the motor is normally rotating, the motor is rotation-driven by alternately supplying the normal drive pulse whose polarity differs.

By doing like the above, even in a case where an abnormal state and the like have occurred, although it is possible to rotate the motor, in a case where the correction drive pulse P2 has been outputted, the demagnetization pulse Pe must be also outputted for the stator demagnetization. That is, in the conventional step motor drive unit, since it is necessary to generate three kinds of pulses of the normal drive pulse, the correction drive pulse and the demagnetization pulse, there is a problem that a circuit constitution becomes complicated and becomes expensive.

Further, unless the demagnetization pulse Pe is outputted after a vibration of the rotor has subsided, an effective demagnetization is not performed. Accordingly, when outputting the demagnetization pulse Pe, since there is a restriction in time, there is a problem that the circuit constitution becomes complicated and thus a reduction in integrated circuit (IC) chip size is difficult, and further becomes expensive one. Further, there is a problem that a high speed drive is impossible.

Additionally, an inspection of whether the demagnetization pulse Pe is being normally outputted becomes also necessary and, from the fact that the inspection is outputted with the polarity reverse to the correction drive pulse P2, there is a problem that the IC becomes more complicated.

The present invention is one made in order to solve the above problems, and its problem is to make it possible by a simple constitution to perform a forcible rotation drive by the correction drive pulse and obtain a demagnetization effect.

SUMMARY OF THE INVENTION

According to the present invention, there is provided a step motor drive unit which has a step motor having a stator, a coil wound in the stator and a rotor rotatably held in the stator, and a drive circuit for supplying a drive pulse whose polarity alternately differs to the coil, and which generates a magnetic flux whose polarity alternately differs in the stator by supplying the drive pulse to the coil from the drive circuit, thereby rotation-driving the rotor in the same direction by a predetermined angle at a time by each of the magnetic flux whose polarity differs, characterized by comprising a control means which, after detecting the fact that the rotor has not rotated by a 1st normal drive pulse of a predetermined energy and rotation-driving the rotor by a correction drive pulse whose energy is larger than the 1st normal drive pulse, rotation-drives the rotor by a 2nd normal drive pulse whose polarity differs from the correction drive pulse and whose energy is larger than the 1st normal drive pulse and smaller than the correction drive pulse.

After detecting the fact that the rotor has not rotated by the 1st normal drive pulse of the predetermined energy and rotation-driving the rotor by the correction drive pulse whose energy is larger than the 1st normal drive pulse, the control means rotation-drives the rotor by the 2nd normal drive pulse whose polarity differs from the correction drive pulse and whose energy is larger than the 1st normal drive pulse and smaller than the correction drive pulse.

Here, there may be constituted such that the control means comprises a rotation detection means for detecting whether or not the rotor is rotated, and a rotation control means which, in a case where the rotation detection means detects the fact that the rotor has not rotated by the 1st normal drive pulse, rotation-drives the rotor by the 2nd normal drive pulse whose polarity differs from the correction drive pulse after the rotor has been rotation-driven by the correction drive pulse.

Further, there may be constituted such that each of the drive pulses differs in its energy by the fact that its pulse width differs.

Further, there may be constituted such that the pulse width of the 2nd normal drive pulse is a drive pulse whose width is wider than the pulse width of the 1st normal drive pulse by for a predetermined number of a predetermined unit pulse width, and, in a case where the rotation detection means has detected the fact that the rotor was rotated by the 2nd normal drive pulse, the rotation control means rotation-drives the rotor by a 3rd normal drive pulse whose width is narrower by for a predetermined number of the unit pulse width than the 2nd normal drive pulse.

Further, there may be constituted such that, in a case where the rotation detection means has detected continuously for a predetermined number of times the fact the rotor was rotated by the 3rd normal drive pulse, the rotation control means rotation-drives the rotor by the 1st normal drive pulse.

Further, there may be constituted such that each of the drive pulses differs in its energy by the fact that its element pulse number differs.

Further, there may be constituted such that each of the drive pulses differs in its energy by the fact that its duty ratio differs.

Further, according to the present invention, there is provided an analog electronic timepiece characterized by having a step motor drive unit according to any one of the above, and rotation-driving a display hand by the step motor drive unit. The step motor drive unit rotation-drives the display hand such as hour hand by rotation-driving the step motor.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

Hereunder, it is explained about a step motor drive unit and an analog electronic timepiece, which are concerned with an embodiment of the present invention.

Figure 1:
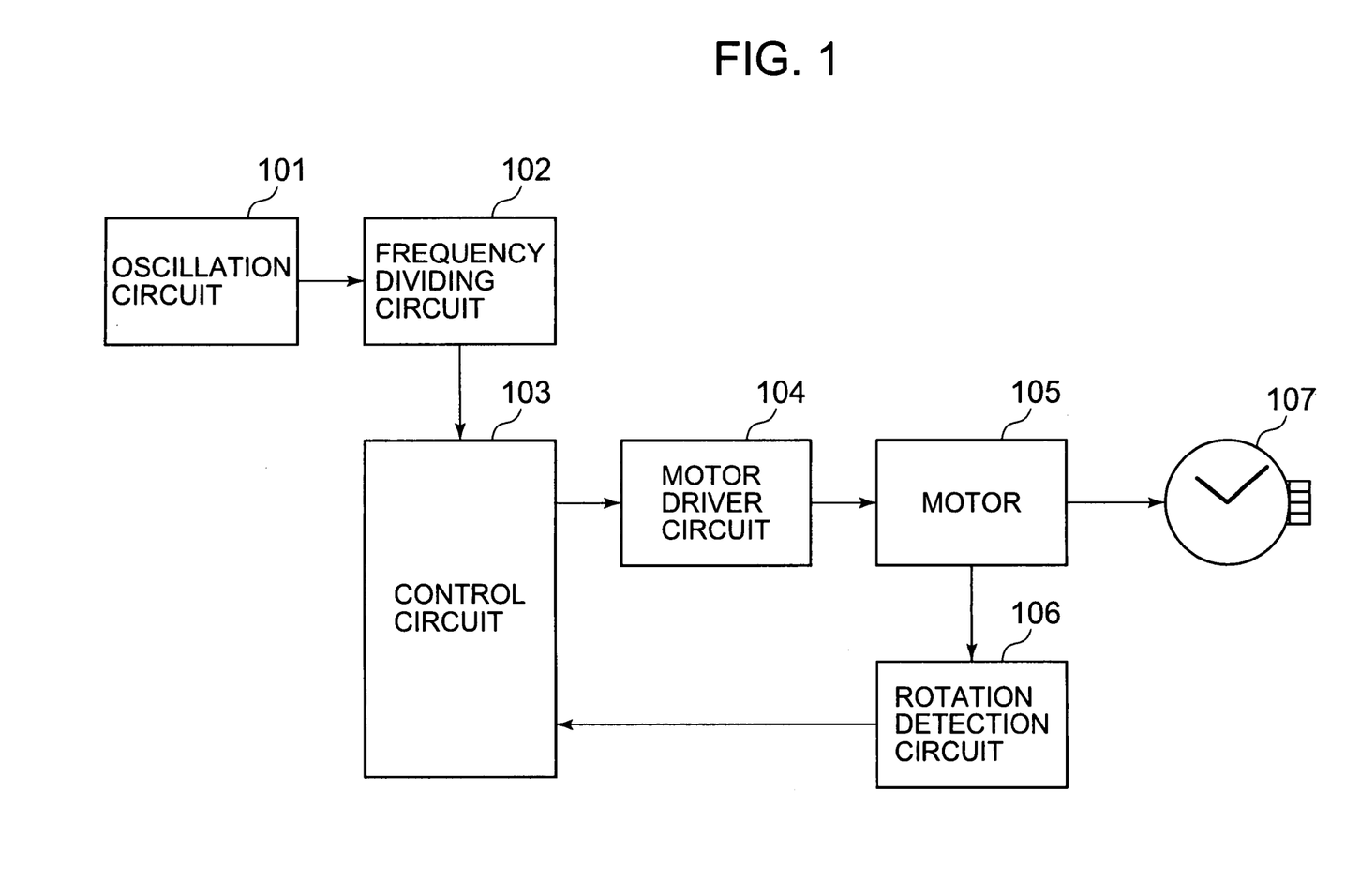
FIG. 1 is a block diagram of an analog electronic timepiece concerned with an embodiment of the present invention.

FIG. 1 is a block diagram showing the step motor drive unit and the analog electronic timepiece using the step motor drive unit, which are concerned with the embodiment of the present invention. As the analog electronic timepiece, there is shown an example of an analog electronic wristwatch.

In FIG. 1, the electronic timepiece possesses an oscillation circuit 101 for outputting a reference clock signal of a predetermined frequency, a frequency dividing circuit 102 for frequency-dividing an output signal of the oscillation circuit 101 to thereby output a time signal becoming a reference of a clocking operation, a control circuit 103, a motor driver circuit 104 for rotation-driving a step motor 105 while responding to a control signal from the control circuit 103, the step motor 105, a rotation detection circuit 106 for detecting whether or not the step motor 105 has rotated, and a time instant display part 107 as a display means containing display hands such as hour, minute and second hands rotation-driven by the step motor 105. The control circuit 103, the motor driver circuit 104, the step motor 105 and the rotation detection circuit 106 constitute the step motor drive unit.

The control circuit 103 is constituted by a central processing unit (CPU) and a memory (both are not shown in the drawing), and constituted so as to perform various controls besides such processings as mentioned later by implementing in the CPU a program previously stored in the memory. Incidentally, the control circuit 103 constitutes a control means for controlling a clocking means for clocking by using the time signal from the frequency dividing circuit 102, and each constituent element and the whole of the electronic timepiece, further constitutes a rotation control means for controlling the rotation drive of the step motor 105 together with the motor driver circuit 104, and additionally constitutes a rotation detection means together with the rotation detection circuit 106.

Figure 2:
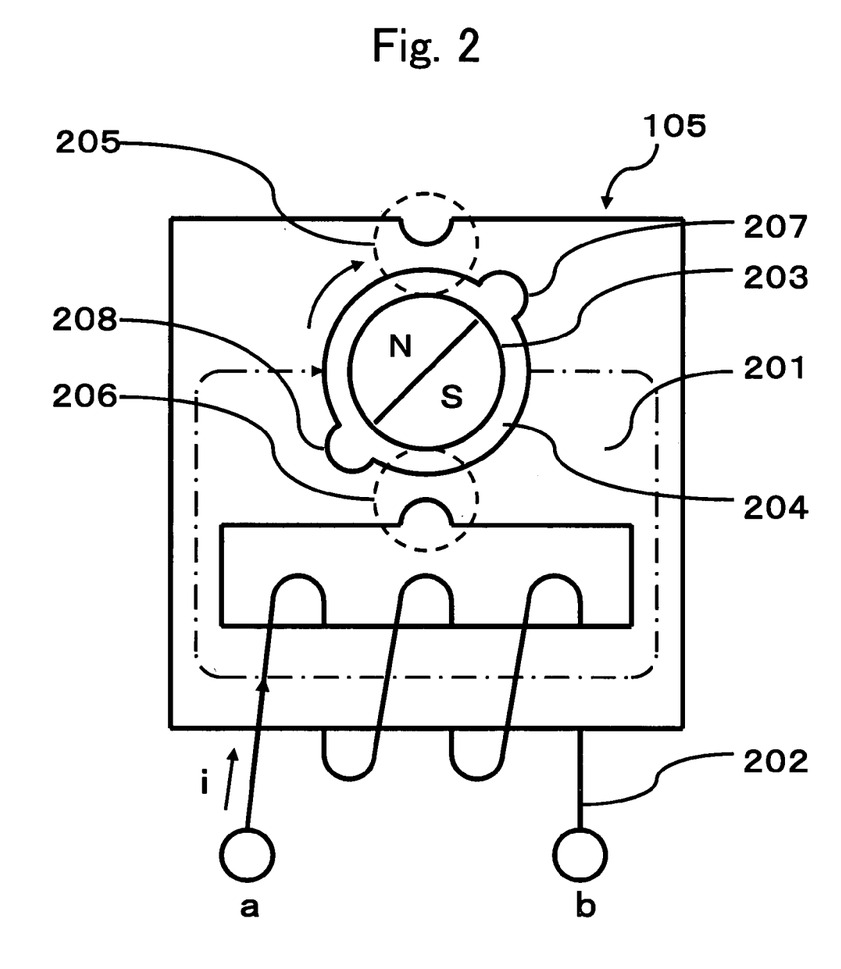
FIG. 2 is a constitutional view of a step motor used in the embodiment of the present invention.

FIG. 2 is a front view of the step motor 105 used in the analog electronic timepiece concerned with the embodiment of the present invention and the like, and its constitution itself is a publicly known step motor.

In FIG. 2, the step motor 105 possesses a stator 201 constituted by a magnetic material, a coil 202 wound in the stator 201, and a 2-pole rotor 203 rotatably disposed in a through-hole 204 provided in the stator 201. In the stator 201, there are formed saturable parts 205, 206, and inner notches 207, 208 for determining a stop position of the rotor 203.

If a current i is flowed in an arrow direction in FIG. 2 by supplying a rectangular wave drive pulse between the terminals a, b of the coil 202, in the stator 201 there is generated a magnetic flux in an arrow direction. By this, the saturable parts 205, 206 are first saturated and, thereafter by an interaction between a magnetic pole generated in the stator 201 and that of the rotor 203, the rotor 203 rotates by 180 degrees in a predetermined direction (arrow direction (positive direction) in FIG. 2). Hereafter, by alternately supplying the drive pulse whose polarity differs to both the terminals a, b of the coil 202, an operation similar to the above is performed, so that the rotor 203 rotates in the positive direction by a predetermined angle (180 degrees) at a time.

FIG. 3 are timing diagrams for explaining operations of the step motor drive unit and the analog electronic timepiece, which are concerned with the embodiment of the present invention. Further, FIG. 4 is a flowchart showing processings in the step motor drive unit and the analog electronic timepiece, which are concerned with the embodiment of the present invention, and a flowchart showing mainly the processings in the control circuit 103.

Hereunder, by using FIG. 1-FIG. 4, there are detailedly explained the operations of the step motor drive unit and the electronic timepiece using the step motor drive unit, which are concerned with the embodiment of the present invention.

Figure 4:
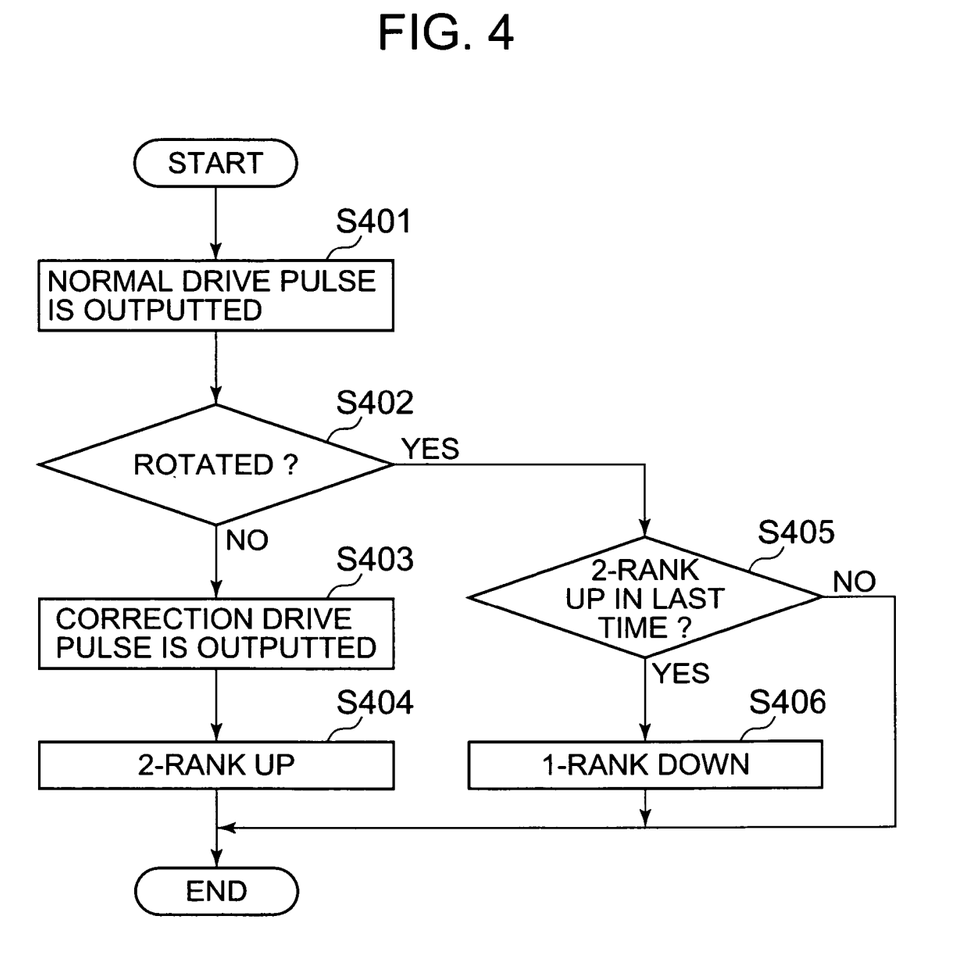
FIG. 4 is a flowchart showing processings in the analog electronic timepiece concerned with the embodiment of the present invention.

First, the control circuit 103 performs the clocking operation by using the time signal from the frequency dividing circuit 102, and outputs to the motor driver circuit 104 a drive control signal for controlling the motor 105 so as to be rotation-driven by the normal drive pulse P11 as a 1st normal drive pulse (step S401 in FIG. 4). Here, the normal drive pulse is not a drive pulse used in the drive at an emergency time (e.g., the correction drive pulse and the demagnetization pulse) but a drive pulse, of a predetermined pulse width, used for rotation-driving the motor 105 at a normal time in which a normal drive operation is performed.

Figure 3A:
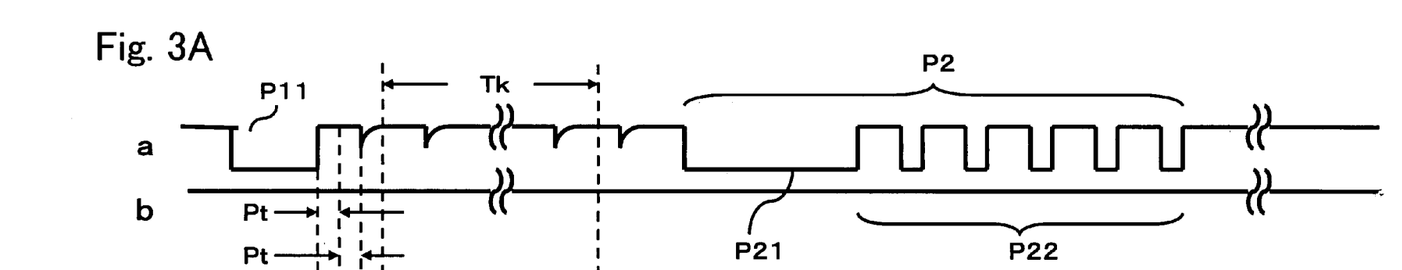
FIG. 3 are timing diagrams of the analog electronic timepiece concerned with the embodiment of the present invention.

The motor driver circuit 104 outputs the normal drive pulse P11 shown in FIG. 3A to the motor 105 while responding to the drive control signal from the control circuit 103, thereby rotation-driving the motor 105.

By the normal drive pulse P11, the rotor 203 of the motor 105 rotates in the predetermined direction (positive direction that is the arrow direction in FIG. 2) by the predetermined angle (180 degrees in the present embodiment).

In the rotation detection term Tk, by the rotation detection circuit 106, it is detected whether or not the motor 105 (in other words, the rotor 203) has rotated. In a case where the motor 105 has rotated, the rotation detection pulse Sr higher than the predetermined level is detected by the rotation detection circuit 106, and a detection signal denoting to the effect that the motor 105 has rotated is outputted from the rotation detection circuit 106 to the control circuit 103. In a case where the motor 105 has not rotated, since the rotation detection pulse Sr higher than the predetermined level is not detected by the rotation detection circuit 106, a detection signal denoting to the effect that the motor 105 has not rotated is outputted from the rotation detection circuit 106 to the control circuit 103.

On the basis of the detection signal from the rotation detection circuit 106, the control circuit 103 judges whether or not the motor 105 has rotated (step S402).

In the step S402, in a case where the control circuit 103 has judged on the basis of the detection signal received from the rotation detection circuit 106 that the motor 105 has not rotated, it supplies the drive control signal to the motor driver circuit 104 and, as shown in FIG. 3A, controls the motor driver circuit 104 so as to rotation-drive the motor 105 by the correction drive pulse P2 (constituted by the pulse portion P21 for the rotation drive and the braking pulse portion P22 for giving the braking to the vibration after the rotor 203 rotation) whose pulse width is wider than the normal drive pulse P11 and which is for forcibly rotating the motor 105 (step S403).

The motor driver circuit 104 forcibly rotates the motor 105 by the correction drive pulse P2 while responding to the drive control signal from the control circuit 103. By this, the rotor 203 of the motor 105 rotates in the predetermined direction (positive direction that is the arrow direction in FIG. 2) by the predetermined angle (180 degrees in the present embodiment) while responding to the normal drive pulse P2. Accordingly, even in the case where the rotor 203 is not rotated by the normal drive pulse P11 owing to the increase in load and the like, it is possible to rotate the rotor 203 by the correction drive pulse P2.

Next, the control circuit 103 causes the drive pulse to rank up (2-rank up in the present embodiment), thereby setting a normal drive pulse P13 as a 2nd normal drive pulse whose width is wider than the normal drive pulse P11 by a predetermined pulse width (in the present embodiment, for the two unit pulse widths Pt corresponding to for the 2-rank up) (step S404). The pulse width of the normal drive pulse P13 becomes a drive pulse whose width is wider by for a predetermined number of the predetermined unit pulse width Pt than the pulse width of the normal drive pulse P11. Incidentally, there is constituted such that the unit pulse width Pt is not narrower than the demagnetization pulse Pe shown in FIG. 7, and is approximately equal to the demagnetization pulse Pe.

Figure 3B:
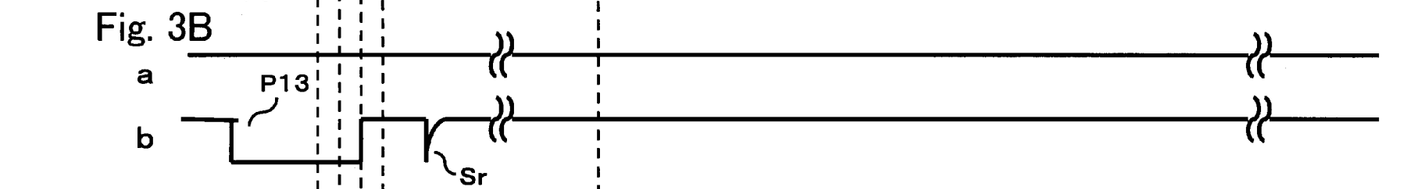

Next, in a case where it returns to the step S401 and the motor 105 is rotation-driven, the control circuit 103 controls the motor driver circuit 104 so as to rotation-drive the motor 105 by using the normal drive pulse P13 of the pulse width set in the step S404. Accordingly, as shown in FIG. 3B, the motor driver circuit 104 rotation-drives the motor 105 by the normal drive pulse P13 whose polarity differs from the correction drive pulse P2 (step S401).

By this, the motor 105 rotates in the predetermined direction (positive direction that is the arrow direction in FIG. 2) by the predetermined angle (180 degrees in the present embodiment) while responding to the normal drive pulse P13.

By doing like this, after the rotation drive by the correction drive pulse P2, since there is performed the drive by the normal drive pulse P13 whose polarity is reverse to the correction drive pulse P2, the rotation drive is performed and there is obtained an effect similar to being demagnetized by the demagnetization pulse Pe.

On the other hand, in the step S402, in a case where the control circuit 103 has judged on the basis of the detection signal received from the rotation detection circuit 106 that the motor 105 has rotated, it judges whether or not the pulse width of the normal drive pulse has been set (ranked up) widely by the predetermined pulse width (in the present embodiment, for the two unit pulse widths Pt corresponding to for the 2-rank up) in the rotation drive of the last time (step S405).

In the step S405, if the control circuit 103 judges that it has been ranked up for the predetermined pulse width in the rotation drive of the last time, it sets the normal drive pulse width to the normal drive pulse whose width has been narrowed by a predetermined pulse width (in the present embodiment, for one unit pulse width Pt corresponding to for 1-rank down) (step S406). By this, the drive pulse is set while being switched from the normal drive pulse P13 to the normal drive pulse P12 as a 3rd normal drive pulse.

Next, in a case where it returns to the step S401 and the motor 105 is rotation-driven, the control circuit 103 controls the motor driver circuit 104 so as to rotation-drive the motor 105 with the polarity different from the rotation drive of the last time by using the normal drive pulse P12 whose pulse width has been set in the step S406.

That is, the pulse width of the normal drive pulse P13 is a drive pulse whose width is wider by for a predetermined number (for two in the present embodiment) of the predetermined unit pulse width Pt than the pulse width of the normal drive pulse P11 and, in a case where the rotation detection circuit 106 has detected the fact that the rotor 203 was rotated by the normal drive pulse P13, the control circuit 103 rotation-drives the rotor 203 by the normal drive pulse P12 whose width is narrower by for a predetermined number (for one in the present embodiment) of the unit pulse width Pt than the normal drive pulse P13. Since there is adapted so as to switch from the normal drive pulse P13 to the normal drive pulse P11 not immediately to the normal drive pulse 12, even in a case where a large motor load still remains, it is possible to rotate the motor 105.

Incidentally, there may be adapted such that, in a case where the rotation detection circuit 106 has detected continuously in a predetermined number of times the fact that the rotor 203 was rotated by the normal drive pulse P13, the control circuit 103 sets while switching to the normal drive pulse P12.

Figure 3C:
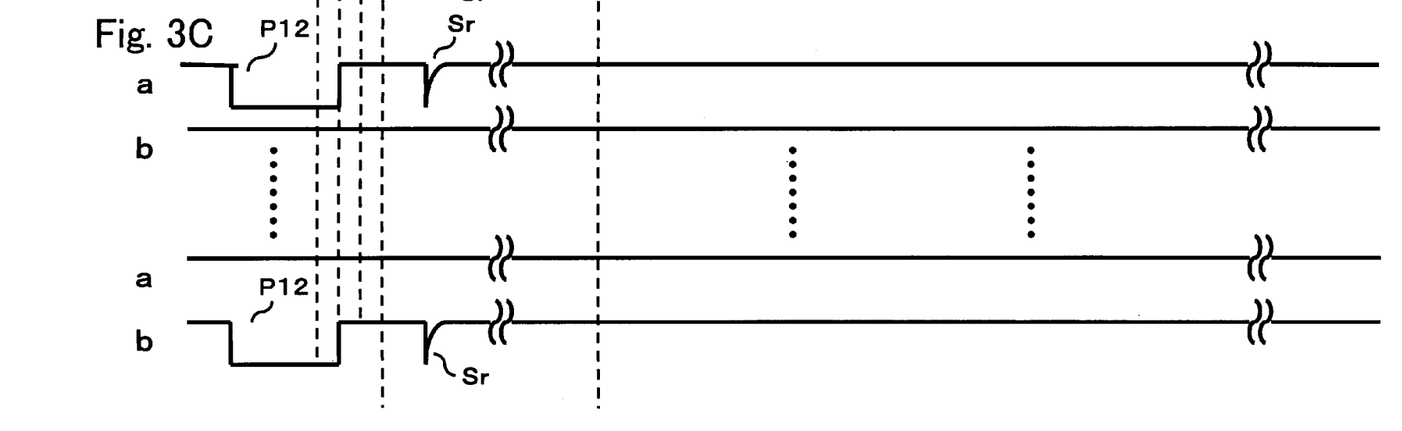

As shown in FIG. 3C, it follows that the motor driver circuit 104 uses the normal drive pulse P12 and rotation-drives the motor 105 with the polarity different from the drive of the last time (step S401). By this, the motor 105 rotates in the predetermined direction (positive direction that is the arrow direction in FIG. 2) by the predetermined angle (180 degrees in the present embodiment) while responding to the normal drive pulse P13.

Thereafter, in a case where the motor 105 normally rotates, the control circuit 103 repeats the processing for returning to the processing step S401 through the processing steps S401, S402, S405 (FIGS. 3B, 3C).

If the control circuit 102 judges that the motor 105 has continuously rotated in a predetermined number of times by the rotation drive by the normal drive pulse P12 whose polarity alternately differs, it alters the drive pulse from the normal drive pulse P12 to the normal drive pulse P11 whose width is narrowest, thereby controlling the motor drive circuit 104 so as to rotation-drive the motor 105. By this, after the rotation drive of the motor becomes stable, and is normally performed, since the motor drive circuit 104 rotation-drives the motor 105 by the normal drive pulse P11 whose polarity alternately differs, the energy saving become more possible.

Hereafter, the above rotation drive operation is performed and, every time the normal drive pulse or the correction drive pulse is applied while alternately changing its polarity to the motor 105 from the motor diver circuit 104 in compliance with an existence/nonexistence of the rotation of the motor 105, the rotor 203 rotates in the predetermined, same direction by 180 degrees at a time and, by this, the display hand of the display part 107 is rotation-driven, so that a time instant display by the display hand is performed.

Figure 5A:
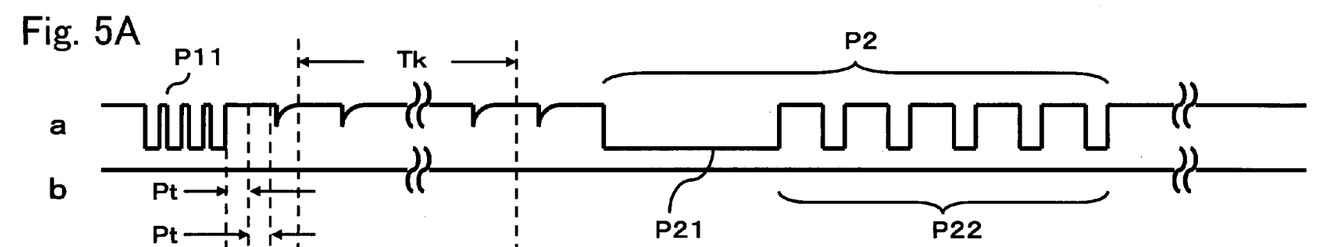
FIG. 5 are timing diagrams of the analog electronic timepiece concerned with other embodiment of the present invention.
Figure 5B:
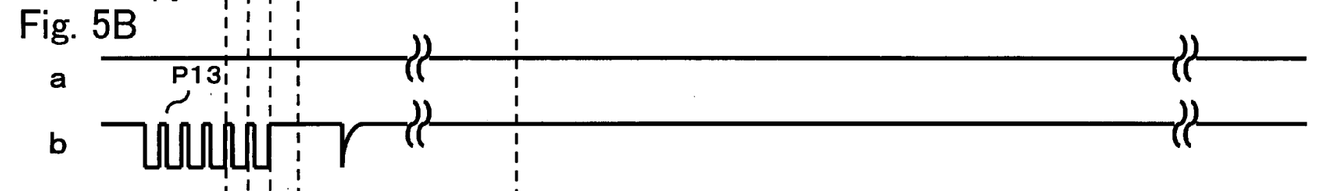
Figure 5C:
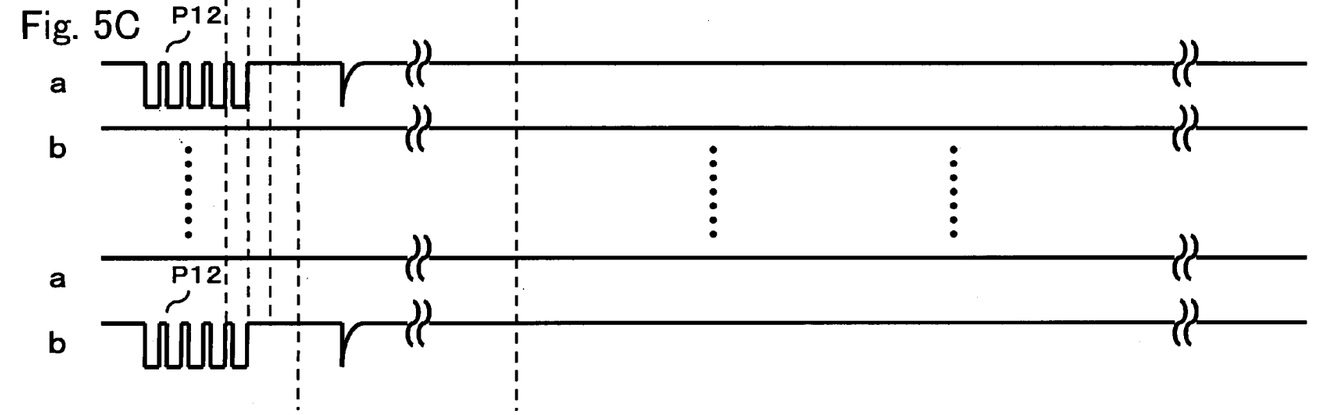

FIG. 5 is a timing diagram of the step motor drive unit and the analog electronic timepiece, which are concerned with other embodiment of the present invention, and the same sign is applied to a signal having the same function as the signal in the FIG. 3, thereby omitting its explanation.

A differentia from the embodiment mentioned above is a point that a signal type of the drive pulse differs. That is, in the above embodiment although there has been adapted so as to alter the pulse width of a single pulse constitution in order to change an energy of the drive pulse, the embodiment of FIG. 5 is adapted such that the drive pulse is constituted by plural pulses (element pulses) and, in a case where the energy of the drive pulse is changed, the number of the element pulses contained in the drive pulse is changed. By this, there is performed the rotation drive operation similar to the above embodiment.

Figure 6A:
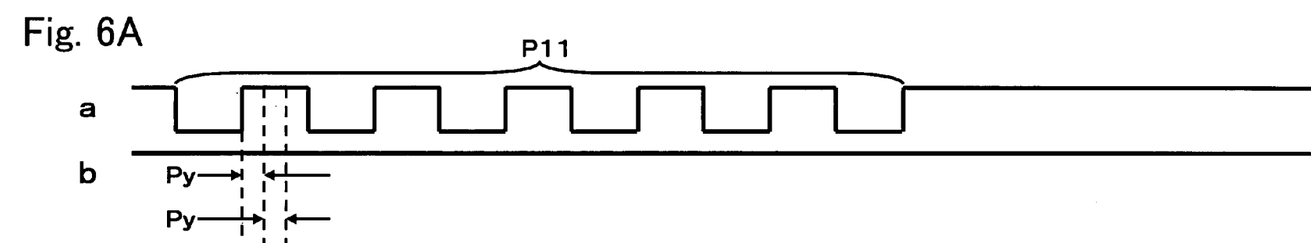
FIG. 6 are timing diagrams of the analog electronic timepiece concerned with other embodiment of the present invention.
Figure 6B:
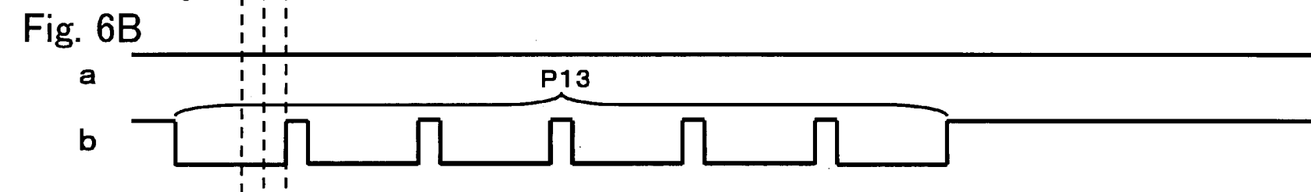
Figure 6C:
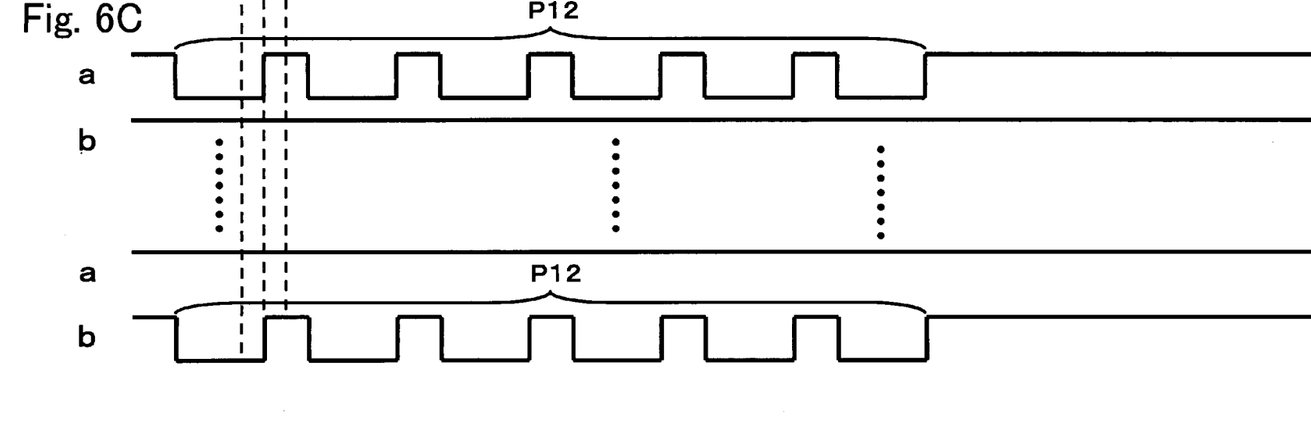

FIG. 6 are timing diagrams of the step motor drive unit and the analog electronic timepiece, which are concerned with other embodiment of the present invention, and the same sign is applied to a signal having the same function as the signal in FIG. 3 and FIG. 5, thereby omitting its explanation.

The differentia from each of the embodiments mentioned above is the point that the signal type of the drive pulse differs, and the present embodiment is adapted so as to change the energy of the drive pulse by changing a duty ratio of the drive pulse. That is, by constituting the drive pulse by plural pulses (element pulses) and by changing the pulse width of each element pulse, the energy of the drive pulse as a gathering of the plural pulses (element pulses) is adapted to be changed. In FIG. 6, each element pulse of the normal drive pulse P12 is constituted narrowly by a time width Py than each element pulse of the normal drive pulse P11, and further each element pulse of the normal drive pulse P13 is constituted narrowly by the time width Py than each element pulse of the normal drive pulse P12. By constituting the normal drive pulses P11-P13 like this, there is performed the rotation drive operation similar to each of the above embodiments.

Incidentally, in each of the above embodiments, although there has been constituted such that each of the drive pulses P11, 12, 13, P2 is respectively the same voltage and mutually differs in the pulse width, the number of the element pulses or the duty ratio, since it suffices if the energy mutually differs, there are possible various modifications, such as causing the energy to differ, by equalizing the pulse width or the like and changing a voltage value or the like. That is, it suffices if a magnitude of the energy of each drive pulse exists in a relation becoming the normal drive pulse P11<the normal drive pulse P12<the normal drive pulse P13<the correction drive pulse P2.

Further, in each of the above embodiments, although the kinds (number of ranks) of the normal drive pulse are made three kinds of P11, P12, P13, a suitable modification such as making them 8 ranks or 16 ranks is possible.

Further, although there has been adapted such that a difference between the energy of the normal drive pulse P13 and the normal drive pulse P11 becomes larger than the energy of the demagnetization pulse Pe, there may be constituted such that it becomes approximately equal to the demagnetization energy. That is, there may be constituted such that, in a case where the rotation is not performed by the rotation drive by the normal drive pulse P11, the rotation drive is performed by the drive pulse P12 whose polarity differs from the correction drive pulse P2 after being rotation-driven by the correction drive pulse P2. Also in this case, there is obtained the demagnetization effect by the energy of the unit pulse width that the drive pulse P12 has.

As mentioned above, the step motor drive unit concerned with the present embodiment is characterized by comprising, in the step motor drive unit which has the step motor 105 having the stator 201, the coil 202 wound in the stator 201 and the rotor 203 rotatably held in the stator 201, and the drive circuit 104 for supplying the drive pulse whose polarity alternately differs to the coil 202, and which generates the magnetic flux whose polarity alternately differs in the stator 201 by supplying the drive pulse to the coil 202 from the drive circuit 104, thereby rotation-driving the rotor 203 in the same direction by the predetermined angle at a time by each of the magnetic flux whose polarity differs, the control means (the control circuit 103, the motor driver circuit 104, the rotation detection circuit 106) which, after detecting the fact that the rotor 203 has not rotated by the 1st normal drive pulse P11 of the predetermined energy and rotation-driving the rotor 203 by the correction drive pulse P2 whose energy is larger than the 1st normal drive pulse P11, rotation-drives the rotor 203 by the 2nd normal drive pulse P13 whose polarity differs from the correction drive pulse and whose energy is larger than the 1st normal drive pulse P11 and smaller than the correction drive pulse P2.

Here, the control means possesses a rotation detection means which detects whether or not the rotor 203 has rotated, and a rotation control means which, in a case where the rotation detection means detects the fact that the rotor 203 has not rotated by the normal drive pulse P11, rotation-drives the rotor 203 by the normal drive pulse P13 after the rotor 203 has been rotation-driven by the correction drive pulse P2.

Accordingly, according to the step motor drive unit concerned with the present invention, since it is possible to perform a demagnetization processing at a correction drive pulse drive time without using a demagnetization pulse, the kinds of the drive pulses can be reduced, so that it becomes possible by the simple constitution to perform the forcible rotation drive by the correction drive pulse and obtain the demagnetization effect. Further, in a case where electronic circuits constituting the step motor drive unit are made the integrated circuit (IC), it becomes possible to miniaturize the unit. Further, it becomes possible to inexpensively constitute it.

Further, according to the analog electronic timepiece concerned with the embodiment of the present invention, since the display hand is rotation-driven by the above step motor drive unit, a constitution is simple and can be miniaturized, and it becomes possible to inexpensively constitute.

It is applicable to the drive unit of various step motors of the constitution having the stator, the coil wound in the stator, and the rotor rotatably held in the stator. Further, it is applicable not only to the electronic wristwatch but also to various analog electronic timepieces such as electronic clock.

According to the present invention, since kinds of the drive pulses can be reduced, it becomes possible by the simple constitution to perform the forcible rotation drive by the correction drive pulse and obtain the demagnetization effect.

What is claimed is:

1. A step motor drive unit comprising:
   a step motor having a stator, a coil wound in the stator and a rotor rotatably held in the stator; and
   a drive circuit for suppllying a drive pulse whose polarity alternately differs to the coil and which generates a magnetic flux whose polarity alternately differs in the stator by supplying the drive pulse to the coil from the drive circuit, thereby rotation-driving the rotor in the same direction by a predetermined angle at a time by each of the magnetic flux whose polarity differs; and
   a control means which, after detecting the fact that the rotor was not rotated by a first normal drive pulse of a predetermined energy and rotation-driving the rotor by a correction drive pulse whose energy is larger than the 1st normal drive pulse, rotation-drives the rotor by a second normal drive pulse whose polarity differs from the correction drive pulse and whose energy is larger than the first normal drive pulse and smaller than the correction drive pulse.

2. A step motor drive unit according to claim 1, wherein the control means comprises while possessing a rotation detection means for detecting whether or not the rotor has rotated, and a rotation control means which, in a case where the rotation detection means has detected the fact that the rotor was not rotated by the first normal drive pulse, rotation-drives the rotor by the second normal drive pulse whose polarity differs from the correction drive pulse after the rotor has been rotation-driven by the correction drive pulse.

3. A step motor drive unit according to claim 1, wherein each of the drive pulses differs in its energy by the fact that its pulse width differs.

4. A step motor drive unit according to claim 3, wherein the pulse width of the second normal drive pulse is a drive pulse whose width is wider than the pulse width of the 1st normal drive pulse by for a predetermined number of a predetermined unit pulse width, and
   in a case where the rotation detection means has detected the fact that the rotor was rotated by the second normal drive pulse, the rotation control means rotation-drives the rotor by a third normal drive pulse whose width is narrower by for a predetermined number of the unit pulse width than the second normal drive pulse.

5. A step motor drive unit according to claim 4, wherein in a case where the rotation detection means has detected continuously in a predetermined number of times the fact the rotor was rotated by the third normal, drive pulse, the rotation control means rotation-drives the rotor by the 1st normal drive pulse.

6. A step motor drive unit according to claim 1, wherein each of the drive pulses differs in its energy by the fact that its element pulse number differs.

7. A step motor drive unit according to claim 1, wherein each of the drive pulses differs in its energy by the fact that its duty ratio differs.

8. An analog electronic timepiece comprising a step motor drive unit according to claim 1, and rotation-driving a display hand by the step motor drive unit.

* * * * *